Oct. 18, 1927.
E. MASLLORENS
1,646,301
PRODUCTION OF RIB TOP FABRICS AND MECHANISM FOR USE IN PRODUCING THE SAME
Filed Jan. 28, 1926    7 Sheets-Sheet 1
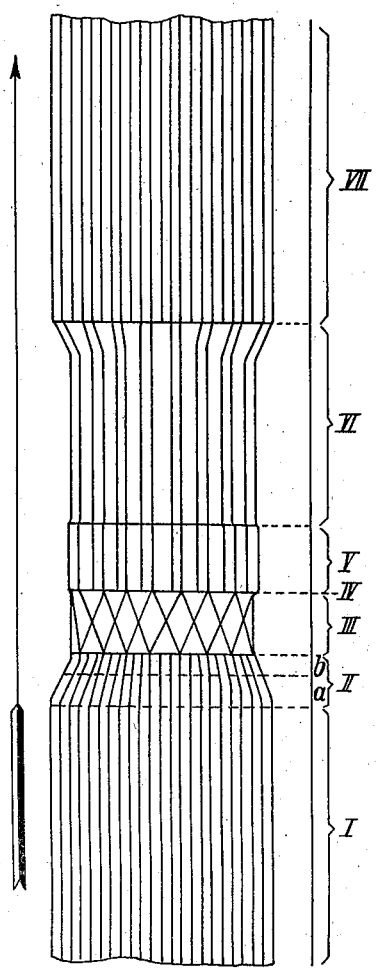
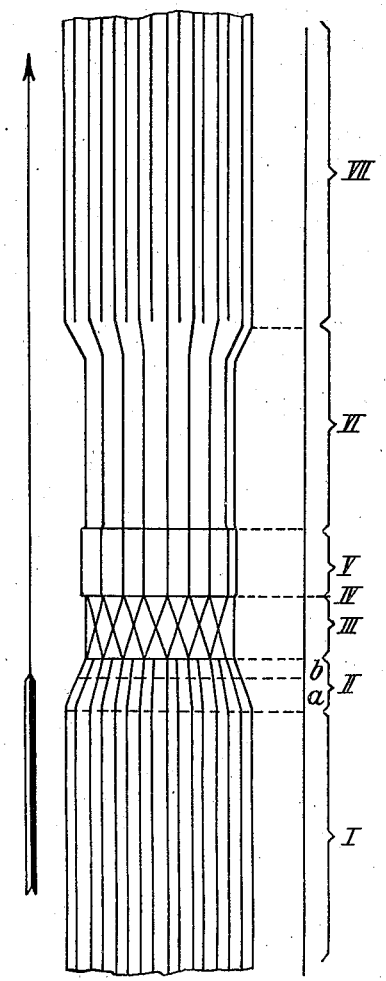
*Inventor:*
*Esteban Masllorens.*
*By William C. Linton.*
*Attorney.*

FIG.3.
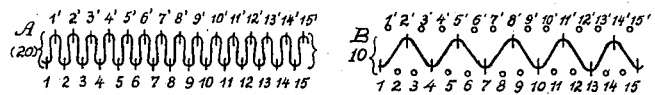
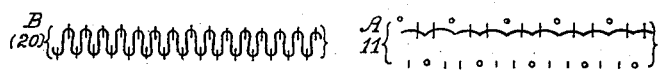
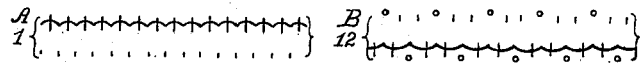
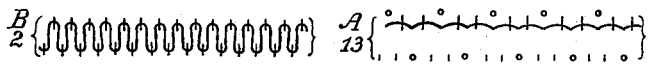
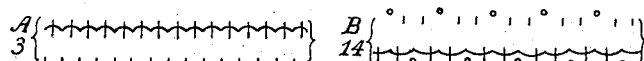
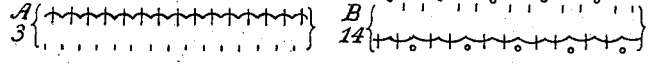
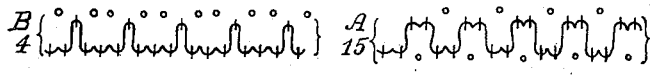
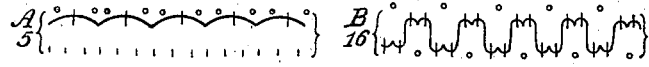
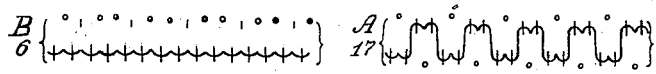
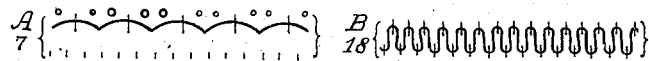
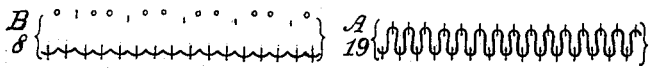
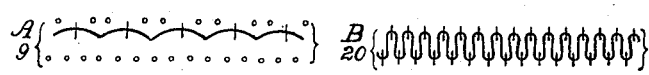
Inventor:
Esteban Masllorens.
By William C. Sinton
Attorney.

Oct. 18, 1927. 1,646,301
E. MASLLORENS
PRODUCTION OF RIB TOP FABRICS AND MECHANISM FOR USE IN
PRODUCING THE SAME
Filed Jan. 28, 1926 7 Sheets-Sheet 6
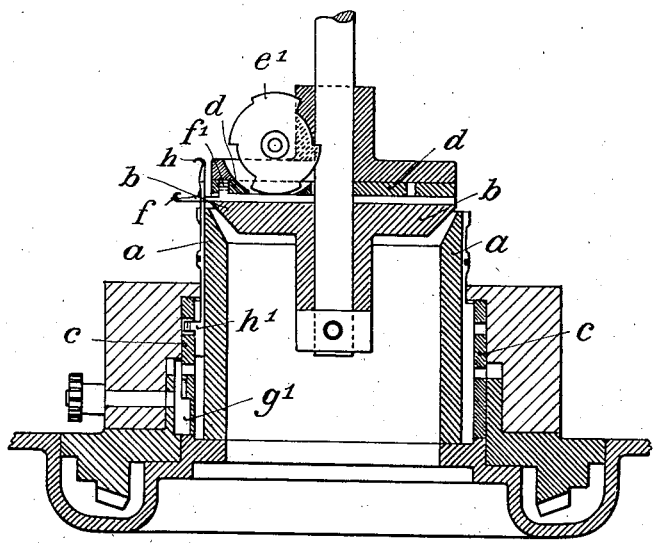
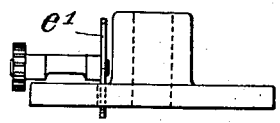
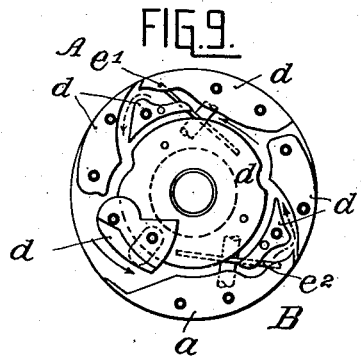
Inventor:
Esteban Masllorens.
By William C. Linton
Attorney.

Oct. 18, 1927. 1,646,301
E. MASLLORENS
PRODUCTION OF RIB TOP FABRICS AND MECHANISM FOR USE IN
PRODUCING THE SAME
Filed Jan. 28 1926 7 Sheets-Sheet 7
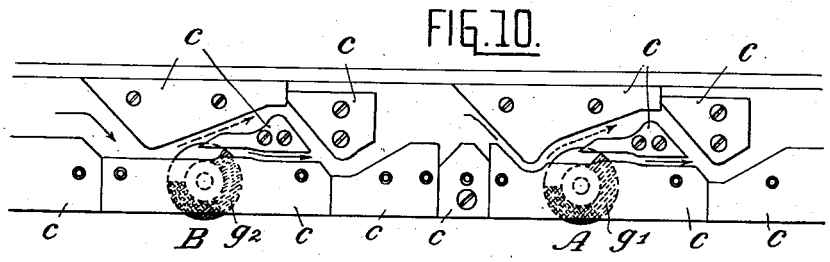
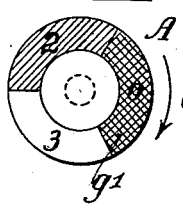
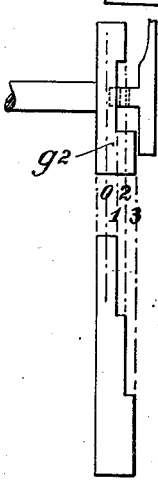
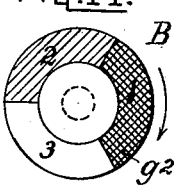
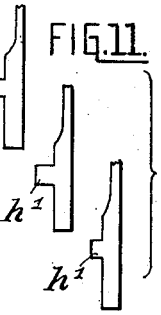
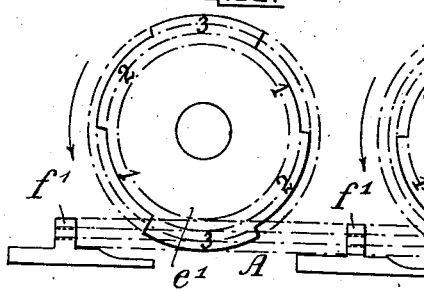
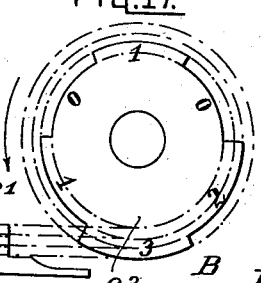
Inventor:
Esteban Masllorens.
By William C. Linton.
Attorney.

Patented Oct. 18, 1927.

1,646,301

UNITED STATES PATENT OFFICE.

ESTEBAN MASLLORENS, OF OLOT, SPAIN, ASSIGNOR TO THE FIRM OF SCHUBERT & SALZER, MASCHINENFABRIK AKTIENGESELLSCHAFT, OF CHEMNITZ, SAXONY.

PRODUCTION OF RIB TOP FABRICS AND MECHANISM FOR USE IN PRODUCING THE SAME.

Application filed January 28, 1926, Serial No. 84,434, and in Germany March 7, 1924.

My invention relates to an improved method for producing knitted rib-top fabrics with alternating different kinds of stitches and to a machine or mechanism for carrying out the method.

This new method affords the possibility of producing rib-top fabric with alternating different kinds of stitches, especially rib-top fabric 2:2 opposite to 1:1 and vice versa, or other alterations of rib stitches; similar ribbed patterns may also alternate with welts and the like. According to this method, there can be produced a knitted fabric, composed of several sections which may be of the same or even different types of stitches.

By this new method it is intended to produce automatically in circular knitting machines, especially on circular rib-top machines or other knitting machines, producing seamless tubular rib-top fabric, the same variety of stitches that hitherto have been produced on straight knitting machines and mostly by hand.

According to the present invention, this result is obtained, on circular knitting machines, especially round rib machines, or other machines producing seamless tubular fabrics, by periodically putting needles in both sets out of action during the knitting process after having cast off their stitches.

The drawing represents two applications of the method by way of example, and a machine for carrying out the method.

Fig. 1 shows a diagrammatic sketch of a 1:1 sleeve with a 2:2 welt cuff, Fig. 2 shows the looping in a machine with two sets of needles and Fig. 3 a diagrammatic view of the forming of the loops of the working sketch Fig. 1. Fig. 4 is a diagrammatic sketch of a 2:2 sleeve with 1:1 (slack) welt cuff. Fig. 5 shows the looping in a machine with two sets of needles and Fig. 6 shows the diagram of the forming of the loops of the working sketch Fig. 4.

Both these examples show simultaneously the automatic beginning of a welt and the transition into the serial succession of different sections of fabric.

Fig. 7 is a section through a knitting machine serving for the method according to Figs. 1 and 4. Fig. 8 shows the lock-cam mechanism of the needle dial of this machine in side view and Fig. 9 in front view. Fig. 10 shows the lock cam mechanism of the needle cylinder of Fig. 7 in plane projection. Fig. 11 shows the different needle butts.

Fig. 12 shows in front elevation the grouping device of the one set (a) of cylinder needles. Fig. 13 is a side elevation of Fig. 12, showing the position of the needle butts and the disc in plane projection.

Fig. 14 represents in front elevation the grouping device of the second set (b) of cylinder needles and Fig. 15 corresponds to Fig. 13 of the first set with the needle butts and the disc in plane projection.

Figs. 16 and 17 show the grouping devices of dial needles in both sets (A and B), and also the position of the needle butts.

In Fig. 1 the succession of the different stitches is assumed to be as follows: I ribbed fabric 1:1 (close); II locking row for the first set of needles (a) and the second set (b); III dividing course; IV starting row (automatic casting on) 1:1 (slack); V welt 2:2; VI rib bed fabric 2:2; VII rib bed fabric (close) like I.

Figure 2:
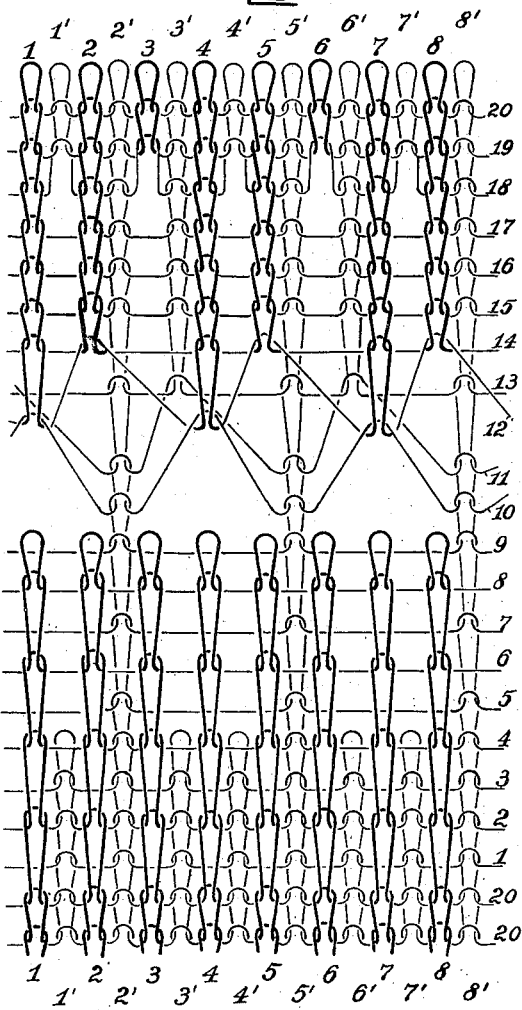

With reference to the looping illustrated in Fig. 2 and the corresponding loop diagram (Fig. 3), the method of producing this section of the work will now be described. Two sets are in operation, marked A and B. The cylinder needles are numbered 1–8 (Fig. 2) or 1–15 (Fig. 3), and the dial needles are numbered 1'–8' (Fig. 2) or 1'–15' (Fig. 3). In Fig. 2 the several rows of loops are marked 1–20, these numbers being likewise indicated in the loop diagram (Fig. 3) so that the working operation can be followed with reference to these two illustrations. Since the work begins with the 1:1 (close) section which is completed in the 20th row, the first rows are all marked 20.

It will be seen that in making 1:1 fabric in both sets A and B, all needles are in operation at the time a section of the fabric is being finished.

Having finished the section of fabric, the transition to another section will take place for example as follows:

On set A a plain row (row 1) is made, only the dial needles being at work. Then follows a ribbed row (1:1) on set B (row 2), all the cylinder and dial needles being at work. Next comes another plain row on set A (row 3), the dial needles alone being in operation.

After these locking rows on the first set a ribbed row is made on set B (row 4). The dial needles, 1', 3', 4', 6', 7', 9', 10', 12', 13', 15', etc., knock over their loops and are put out of action, so that, in the further operations, only the dial needles 2', 5', 8', 11', 14' etc. and all the cylinder needles are working. Then follows a plain row on set, A, only the dial needles 2', 5', 8', 11', 14' etc. (row 5) being in operation.

The following row is a plain row on set B, with only the cylinder needles working (row 6), whereafter comes another plain row on set A with only the dial needles 2', 5', 8', 11', 14' etc. in action (row 7), and next follows a plain row on set B, with only the cylinder needles (row 8) working. The next row is a dividing course on set A, produced by means of the dial needles 2', 5', 8', 11', 14' etc. only (row 9). After the locking rows of the second set all the cylinder needles have knocked over their loops and are put out of action.

After this has been done, the needle position is ready, without off setting, for the automatic starting row in 1:1 (slack). Hitherto there were provided for example, two locking rows for each set. But no modification in the method is involved by interposing only one locking row for each set. There may also be inserted (slack) 1:1 rows before the actual dividing course, if another locking row is first made before doffing to produce the 1:1 (slack) row.

The new section of fabric is now begun by pushing forward the cylinder needles, 1, 4, 7, 10, 13 etc. and the dial needles 2', 5', 8', 11', 14' etc. a ribbed row 1:1 (slack) on set B will be made as the beginning of the welt of the new section of fabric (row 10). For making the welt in 2:2 there is first made a plain row in set A. Along with the dial needles 2', 5', 8', 11', 14' etc. the other dial needles 3', 6', 9', 12', 15' etc. also come into action so that the dial needles 2', 3', 5', 6', 8', 9', 11', 12', 14', 15' etc. will be working, but no cylinder needles (row 11). Next follows a plain row in set B. To this cylinder needles 1, 4, 7, 10, 13 etc. have been added the needles 2, 5, 8, 11, 14 etc. so that the cylinder needles 1, 2, 4, 5, 7, 8, 10, 11, 13, 14 etc. are working, but again none of the dial needles in this set (row 12).

Then follows a plain row on set A where again only the dial needles 2', 3', 5', 6', 8', 9', 11', 12' 14', 15' etc. are working, but no cylinder needles (row 13); and a plain row on set B, where only the cylinder needles 1, 2, 4, 5, 7, 8, 10, 11, 13, 14 etc. are working, but no dial needles (row 14). This setting and working of the needles continues till the welt is finished. In set A a ribbed row in 2:2, will be made the dial needles 2', 3', 5', 6', 8', 9', 11', 12', 14', 15' etc. and the cylinder needles, 1, 2, 4, 5, 7, 8, 10, 11, 13, 14, etc. being at work (row 15). This operation is repeated on set B (row 16) and continued on A (row 17), alternately with B, till the cuff or ruffle is finished. If the transition from ribbed fabric 2:2 into ribbed fabric 1:1 is desired, a ribbed row in 1:1 (close) should be made on set B, the dial needles 2', 3', 5', 6', 8', 9', 11', 12', 14', 15' etc. being supplemented by the dial needles 1', 4', 7', 10', 13' etc. and the cylinder needles 1, 2, 4, 5, 7, 8, 10, 11, 13, 14 etc. by the cylinder needles, 3, 6, 9, 12, 15 etc., so that all the needles are now working again (row 18).

This manner of operating is continued in both sets A (row 19) and B (row 20) until the desired length of the section of fabric is completed.

In Fig. 4 the succession of operations is assumed to be as follows: I ribbed fabric 2:2; II locking row for the first (a) and second (b) sets; III dividing course, IV automatic starting in 1:1; V welt in 1:1 (slack); VI ribbed fabric in 1:1; VII ribbed fabric in 2:2.

Figure 5:
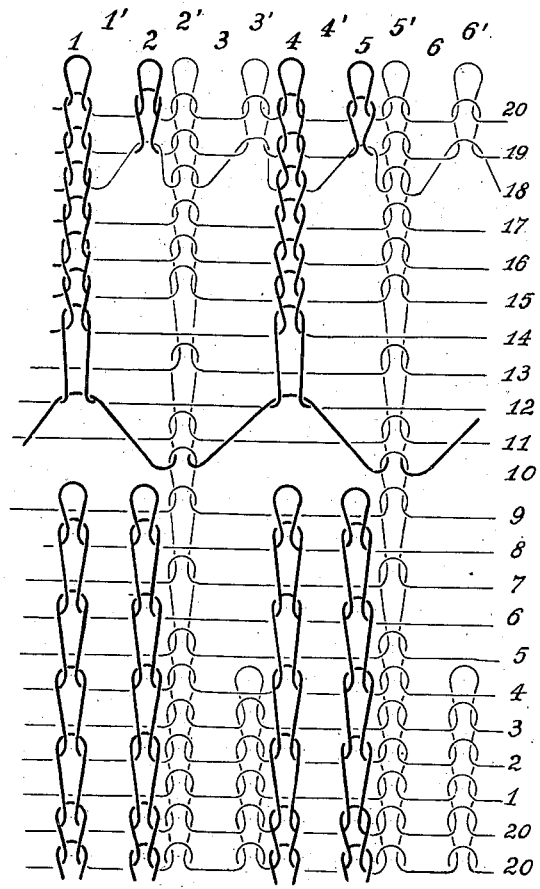
Figure 6:
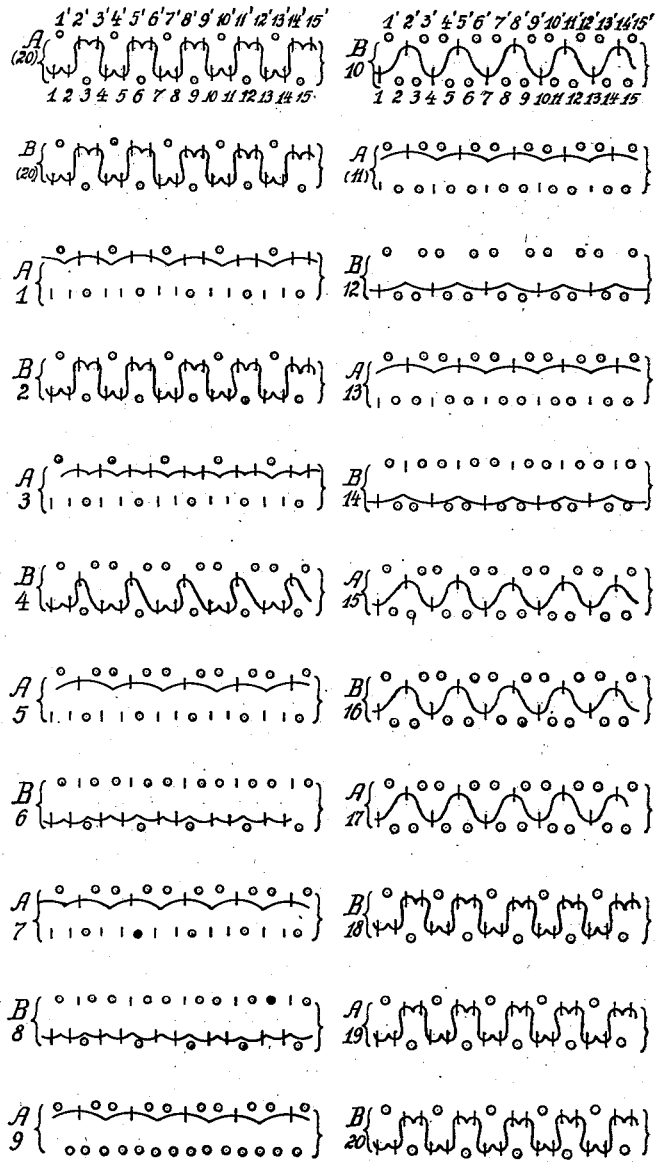

With reference to the looping shown in Fig. 5 and the corresponding scheme for making loops in Fig. 6 the method of producing this fabric is as follows: Here again a two row machine is used, and the reference numerals for the sets and for the cylinder and dial-needles is the same as in the first example (Figs. 2 and 3).

The old section of fabric consists of a 2:2 rib stitch, the cylinder needles 1, 2, 4, 5, 7, 8, 10, 11, 13, 14 etc. and the dial needles 2', 3', 5', 6', 8', 9', 11', 12', 14', 15' etc. (row 20) being used.

When the old section of fabric is completed, the transition is effected as follows:

Row 1: A plain row on set A, with only the dial needles 2', 3', 5', 6', 8', 9', 11', 12', 14', 15' etc. working.

Row 2: A ribbed row 2:2 on set B, with the cylinder needles, 1, 2, 4, 5, 7, 8, 10, 11, 13, 14 etc. and the dial needles 2', 3', 5', 6', 8', 9', 11', 12', 14', 15' etc. working.

Row 3: A plain row on set A, with only the dial needles 2', 3', 5', 6', 8', 9', 11', 12', 14', 15' etc. working.

Row 4: A ribbed row on set B. The dial needles 3', 6', 9', 12', 15' etc. have knocked over their loops and are put out of action, so that for the moment only the dial needles 2', 5', 8', 11', 14' etc. and the cylinder needles 1, 2, 4, 5, 7, 8, 10, 11, 13, 14 etc. are working.

Row 5: A plain row on set A with only the dial needles 2', 5', 8', 11', 14' etc. working.

Row 6: A plain row on set B, with only the cylinder needles 1, 2, 4, 5, 7, 8, 10, 11, 13, 14 etc. working.

Row 7: A plain row on set A, with only the dial needles 2′, 5′, 8′, 11′, 14′ etc. working.

Row 8: A plain row on set B, with only the cylinder needles 1, 2, 4, 5, 7, 8, 10, 11, 13, 14 etc. working.

Row 9: A dividing course on set A, with only the dial needles 2′, 5′, 8′, 11′, 14′ etc. working, all the cylinder needles having doffed their loops and been put out of action.

The needle position is now ready for row 10, automatic starting row in 1:1 (slack) without off setting. Hitherto two locking rows have, for example been employed for each set, but no alteration in the method is entailed, when only one locking row is inserted for each set. Slack 1:1 rows might also be inserted before the actual dividing course, if locking rows have again first been made, and the knocking over to 1:1 (slack) has been deferred until this has been done.

Row 10: A ribbed row in 1:1 (slack) on set B, with only the dial needles 2′, 5′, 8′, 11′, 14′ etc. and the cylinder needles 1, 4, 7, 10, 13 etc. working. This represents the beginning of the welt of the new section of fabric.

Row 11: A plain row on set A, with only the dial needles 2′, 5′, 8′, 11′, 14′ etc. working.

Row 12: A plain row on set B, with only the cylinder needles 1, 4, 7, 10, 13 etc. working.

Row 13: A plain row on set A, with only the dial needles 2′, 5′, 8′, 11′, 14′ etc. working.

Row 14: A plain row on set B, with only the cylinder needles, 1, 4, 7, 10, 13 etc. working.

This procedure should be continued till the welt is finished.

Row 15: A ribbed row in 1:1 (slack) on set A, with only the dial needles 2′, 5′, 8′, 11′, 14′ etc. and only the cylinder needles 1, 4, 7, 10, 13 etc. working.

Rows 16 and 17: Exactly as in row 15, till the cuff or ruffle is finished.

Row 18: A ribbed row in 2:2 on set B, the dial needles 2′, 5′, 8′, 11′, 14′ etc. being supplemented by 3′, 6′, 9′, 12′, 15′ etc. and the cylinder needles 1, 4, 7, 10, 13 etc. by 2, 5, 8, 11, 14 etc. so that in the dial the needles 2′, 3′, 5′, 6′, 8′ 9′, 11′, 12′, 14′, 15′ etc. are acting and in the cylinder the needles 1, 2, 4, 5, 7, 8, 10, 11, 13, 14 etc.

Rows 19 and 20 etc.: In the same way as row 18 in both sets, till the desired length of the section of fabric is obtained.

Figs. 7–17 show by way of example, the form of construction of a machine for carrying out the foregoing method.

$a$ is the needle cylinder, $b$ the dial, $c$ are the cylinder cams, $d$ are the dial cams; $e$ is an assorting device for the dial needles in the form of a stepped disc, one being provided for each set, $f$ are the dial needles and $f'$ their butts; $g'$ and $g^2$ are the assorting devices for the cylinder needles in Fig. 10, which consist of discs graduated on the front side; $h$ are the cylinder needles, and $h'$ their butts.

The needle assorting devices are duplicated, the machine being of the two row pattern, namely, one each for set A and set B. The butts of the cylinder and dial needles are supposed to be of three different lengths.

According to the examples represented each needle assorting device for the cylinder needles consists of stepped discs $g'$ and $g^2$ mounted on a shaft, the drive motion being effected by a pinion (Fig. 7). The discs $g'$ and $g^2$ are so arranged in front of the needle lever of the cams $c$, that the needle butts $h'$ can be brought within their reach. The width of the discs is irregular. As shown in Fig. 12, the disc of set A is of full width over one-third of the perimeter (3) in the next third ($o$) it is stepped in conformity with the difference in the height of two successive butts, and in the final third (2) it is further stepped by twice the aforesaid difference. The disc of the other set B (Fig. 14) is of full height in the first one-third of its perimeter (3), in the next third (2) it is stepped in conformity with the difference in height of two successive butts, and in the final third (1) is further diminished to a similar extent. In Fig. 13 it can be seen, that the needles, as shown in Fig. 11, have three different lengths of butt and are acted upon by the disc $g'$ as described below. When the disc is so adjusted that the part $o$ is in the path of the needle-butts, it has no action on the latter, these being guided only by means of the cams $c$ (Fig. 10). If the part 3 is so adjusted, all the butts will strike against it and will lift the needles, so that they take the path indicated by the dotted arrow in Fig. 10. If the part 2 be set in position, the needles with the shortest butt will slip past without being lifted, whilst only those needles provided with medium and long butts will be raised. If part 1 is brought into the working position (Fig. 15), only the needles with the longest butts will be lifted, whilst those with short and medium butts will follow the path indicated by the unbroken arrow in Fig. 10.

In the same manner the dial needles are influenced by means of the disc $e'$ (set A) and $e^2$ (set B) Figs. 16, 17. These discs, also, reach up into the path of the needle butts $f'$ and regulate their path in the lock. According to the examples shown there are six graduations, adapted to act alternately upon the needles with butts of three different lengths. In this case also the part 0 remains without effect on the needle butts, the part 3 acts upon all three kinds of needle butts, part 2 only upon the medium and longest ones, and part 1 exclusively upon the longest ones.

The shape of the cams $g'$, $g^2$, and $e'$, $e^2$ depends on the fabric to be made. The adjustment of these cams will be effected by well known auxiliary means (pattern chains etc.).

The mode of action of the grouping device is as follows:

When dial needles are guided in the direction of the arrow (Fig. 9) through the needle slot, they meet the grouping device $e^2$ in set B. According as the needle slot is closed by a smaller or larger sector diameter all the needles or only some of them will pass by the sector, or be forced into the path marked by dotted lines. The same proceeding is repeated at the grouping device $e'$ (set A).

The grouping devices $g^1$ and $g^2$ of the cylinder needles (Fig. 10) in the sets B and A act in the same way. According as these grouping devices are set or automatically adjusted, the needles are lifted in accordance with the kind of stitch in question and to the different length of their butts by means of the allotted disc segment either into the path of the needle slot indicated by dotted lines or will slide under the cams $a$.

This periodical selection of single needles on the desired row of loops and the self acting feed motion of these grouping or selecting devices $e'$, $e^2$ and $g'$, $g^2$ effects the progressive change in the type of stitches, as shown in Figs. 1-3 and 4-6, the casting off or doffing of yarn from the needles being effected with the failure of the cylinder needles to take yarn, as when they pass through their inoperative paths of the cam operating means for the same, hence, causing the loops thereof to be cast off.

What I claim is:

1. In combination with a special stitch forming circular knitting machine including a set of cylinder and a set of dial needles, each of said sets of needles having butts of different lengths, cam operating means for the sets of needles having operative and inoperative paths, selecting devices for selectively engaging and causing certain of said sets of needles to be moved through operative courses, each of said selecting devices for the dial needles consisting of discs of different radii engageable with the different lengths of butts of the set of dial needles for causing the same to take operative or inoperative paths through said cam operating means.

2. In combination with a special stitch forming circular knitting machine including a set of cylinder and a set of dial needles, each of said sets of needles having butts of different lengths, cam operating means for the sets of needles having operative and inoperative paths, selecting devices for selectively engaging and causing certain of said sets of needles to be moved through operative courses, the selecting devices for the cylinder needles each consisting of discs of different widths in axial directions engageable with the different lengths of butts of the set of cylinder needles for causing the same to take operative or inoperative paths through said cam operating means.

In testimony whereof I affix my signature.

ESTEBAN MASLLORENS.